(12) United States Patent
Stoia et al.

(10) Patent No.: US 12,044,180 B2
(45) Date of Patent: Jul. 23, 2024

(54) TORCH IGNITER FOR A COMBUSTOR

(71) Applicant: General Electric Company, Schenectady, NY (US)

(72) Inventors: Lucas John Stoia, Greenville, SC (US); Yimin Huang, Greenville, SC (US); Abdul Khan, Greenville, SC (US); Thomas Edward Johnson, Greenville, SC (US); Heath M. Ostebee, Greenville, SC (US); Jayaprakash Natarajan, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/975,110

(22) Filed: Oct. 27, 2022

(65) Prior Publication Data

US 2023/0045965 A1    Feb. 16, 2023

Related U.S. Application Data (62) Division of application No. 15/664,025, filed on Jul. 31, 2017, now Pat. No. 11,519,334.

(51) Int. Cl.
*F02C 7/266* (2006.01)
*F23R 3/28* (2006.01)
(Continued)

(52) U.S. Cl.
CPC .............. *F02C 7/266* (2013.01); *F23R 3/286* (2013.01); *F23R 3/343* (2013.01); *F23R 3/42* (2013.01)

(58) Field of Classification Search
CPC .. F02C 7/26; F02C 7/264; F02C 7/266; F23R 3/286; F23R 3/343; F23R 3/42
See application file for complete search history.

(56) References Cited

U.S. PATENT DOCUMENTS 2,784,553 A * 3/1957 De Corso .............. F02C 7/264
                                                            60/39.826
2,865,441 A   12/1958 Coupe
(Continued)

FOREIGN PATENT DOCUMENTS

DE     1096684 B    1/1961
EP     2813684 A1   12/2014
(Continued)

OTHER PUBLICATIONS

European Search Report Corresponding to Application No. 18185697 on Oct. 22, 2018.
(Continued)

*Primary Examiner* — Arun Goyal
*Assistant Examiner* — Henry Ng
(74) *Attorney, Agent, or Firm* — Dority & Manning, P.A.

(57) ABSTRACT

An igniter for a combustor of a turbomachine includes a fuel inlet in fluid communication with a mixing plenum. The mixing plenum is positioned upstream of a mixing channel. An air inlet is in fluid communication with the mixing plenum and an ignition source is in operative communication with the mixing channel. The igniter may include a mounting flange configured for coupling the igniter to the combustor. The ignition source may be positioned proximate to a downstream end of the mixing channel and upstream of the mounting flange. The mixing channel may define a venturi shape. The venturi shape includes a converging section between an upstream end of the mixing channel and a venturi throat.

18 Claims, 7 Drawing Sheets

(51) Int. Cl.
*F23R 3/34* (2006.01)
*F23R 3/42* (2006.01)

(56) References Cited

U.S. PATENT DOCUMENTS

| | | | |
|---|---|---|---|
| 4,141,213 | A | 2/1979 | Ross |
| 4,825,658 | A | 5/1989 | Beebe |
| 4,860,533 | A | 8/1989 | Joshi |
| 5,491,972 | A | 2/1996 | Bretz et al. |
| 5,636,511 | A | 6/1997 | Pfefferle et al. |
| 5,640,841 | A | 6/1997 | Crosby |
| 5,660,043 | A | 8/1997 | Pfefferle et al. |
| 6,311,475 | B1 | 11/2001 | Ngo-Beelman et al. |
| 6,374,615 | B1 | 4/2002 | Zupanc et al. |
| 6,408,611 | B1 | 6/2002 | Keller et al. |
| 6,912,857 | B2 | 7/2005 | Schmotolocha et al. |
| 7,137,256 | B1 | 11/2006 | Stuttaford et al. |
| 7,299,620 | B2 | 11/2007 | Stuttaford et al. |
| 8,522,553 | B2 | 9/2013 | Widener |
| 8,966,879 | B1 | 3/2015 | Munson |
| 2002/0170294 | A1 | 11/2002 | Stalder et al. |
| 2004/0031257 | A1 | 2/2004 | Schmotolocha et al. |
| 2004/0221582 | A1 | 11/2004 | Howell et al. |
| 2004/0237532 | A1 | 12/2004 | Howell et al. |
| 2005/0284442 | A1* | 12/2005 | Stuttaford ............... F02C 7/266 123/297 |
| 2008/0264372 | A1 | 10/2008 | Sisk et al. |
| 2012/0117976 | A1 | 5/2012 | Krull et al. |
| 2012/0227413 | A1* | 9/2012 | Vigneron ............... F23R 3/343 60/776 |
| 2013/0125548 | A1 | 5/2013 | Dutta et al. |
| 2013/0344448 | A1 | 12/2013 | Tilmont et al. |
| 2015/0040575 | A1 | 2/2015 | Martinez Fabre et al. |
| 2015/0047361 | A1 | 2/2015 | Williams et al. |
| 2015/0260406 | A1 | 9/2015 | Carrere |
| 2015/0369488 | A1 | 12/2015 | Singh et al. |
| 2016/0003150 | A1 | 1/2016 | DiCintio et al. |
| 2016/0047318 | A1 | 2/2016 | Dam et al. |
| 2017/0009994 | A1* | 1/2017 | Buchanan ............... F02C 7/264 |
| 2017/0350590 | A1 | 12/2017 | Choudhri et al. |
| 2019/0010872 | A1 | 1/2019 | Dam et al. |

FOREIGN PATENT DOCUMENTS

| | | |
|---|---|---|
| JP | 2009281688 A | 12/2009 |
| JP | 2013177988 A | 9/2013 |

OTHER PUBLICATIONS

European Office Action Corresponding to Application No. 18185697 on Aug. 18, 2020.
European Search Report Corresponding to Application No. 23162301 on Jun. 5, 2023.

* cited by examiner

TORCH IGNITER FOR A COMBUSTOR

RELATED APPLICATIONS

This application is a divisional application of U.S. Non-Provisional patent application Ser. No. 15/664,025 having a filing date of Jul. 31, 2017, the disclosure of which is incorporated by reference herein in its entirety.

FIELD

The present disclosure generally involves an apparatus for igniting a combustor of a turbomachine.

BACKGROUND

Gas turbines, aircraft engines, and numerous other combustion-based systems include one or more combustors that mix a working fluid such as air with fuel and ignite the fuel-air mixture to produce high temperature and pressure combustion gases. For example, commercial gas turbines may be used for generating power. A typical gas turbine used to generate electrical power includes, in serial flow order, a compressor, a combustor and a turbine. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows through one or more nozzles where the compressed working fluid mixes with fuel and then flows into a combustion chamber in each combustor where the mixture ignites to generate combustion gases having a high temperature and pressure. The combustion gases expand in the turbine to produce work. For example, expansion of the combustion gases in the turbine may rotate a shaft connected to a generator to produce electricity.

The combustion may be initiated by an ignition system in one or more combustors. The ignition system may produce a spark or other source of ignition, e.g., a laser beam or pilot flame, inside of the combustor.

The ignition system is often located along a side of the combustion chamber so that the ignition system may project the spark, beam, or flame into the combustion chamber approximately coincident with the fuel-air mixture. The location of the ignition system along the side of the combustion chamber requires a penetration through the liner of the combustor, creating a potential source of leakage and/or turbulent flow through or around the penetration. In addition, ignition systems located along the side of the combustor necessarily interfere with the flow of the working fluid between the liner and the flow sleeve, thereby increasing the differential pressure of the working fluid across the combustor which decreases the overall efficiency of the gas turbine. Such configurations may result in reduced amount and/or flow rate of working fluid available to mix with the fuel in the nozzles. The amount of working fluid available for premixing with fuel has a direct impact on the peak flame temperatures and NOx emissions.

The ignition system may include an ignition torch. The ignition torch may receive a flow of fuel and a flow of air. The air and fuel may mix in the torch and be ignited by an ignition source, such as a spark plug, in order to provide a pilot flame to initiate combustion in the combustion chamber. The spark plug is typically located proximate to the combustion chamber.

BRIEF DESCRIPTION

Aspects and advantages are set forth below in the following description, or may be obvious from the description, or may be learned through practice.

According to one embodiment, a gas turbine is provided. The gas turbine includes a compressor, a turbine, and a combustor disposed downstream from the compressor and upstream from the turbine. The gas turbine also includes an igniter in operative communication with the combustor. The igniter includes a mixing channel defining a venturi shape. The venturi shape includes a converging section between an upstream end of the mixing channel and a venturi throat. The igniter also includes a fuel inlet in fluid communication with a mixing plenum. The mixing plenum is positioned upstream of the mixing channel. The igniter also includes an air inlet in fluid communication with the mixing plenum and an ignition source in operative communication with the mixing channel. The ignition source is positioned downstream of the mixing plenum.

According to another embodiment, an igniter for a combustor of a turbomachine is provided. The igniter includes a mounting flange configured for coupling the igniter to the combustor. The igniter also includes a fuel inlet in fluid communication with a mixing plenum. The mixing plenum is positioned upstream of a mixing channel. The igniter also includes an air inlet in fluid communication with the mixing plenum and an ignition source in operative communication with the mixing channel. The ignition source is positioned proximate to a downstream end of the mixing channel and upstream of the mounting flange.

According to yet another embodiment, an igniter for a combustor of a turbomachine is provided. The igniter includes a mixing channel defining a venturi shape. The venturi shape includes a converging section between an upstream end of the mixing channel and a venturi throat. The igniter also includes a fuel inlet in fluid communication with a mixing plenum. The mixing plenum is positioned upstream of the mixing channel. The igniter also includes an air inlet in fluid communication with the mixing plenum and an ignition source in operative communication with the mixing channel. The ignition source is positioned downstream of the mixing plenum.

Those of ordinary skill in the art will better appreciate the features and aspects of such embodiments, and others, upon review of the specification.

BRIEF DESCRIPTION OF THE DRAWINGS

A full and enabling disclosure of various embodiments, including the best mode thereof to one skilled in the art, is set forth more particularly in the remainder of the specification, including reference to the accompanying figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a land based power generating gas turbine combustor for purposes of illustration, one of ordinary skill in the art will readily appreciate that embodiments of the present disclosure may be applied to any style or type of turbomachine and are not limited to land based power generating gas turbines unless specifically recited in the claims.

Figure 1:
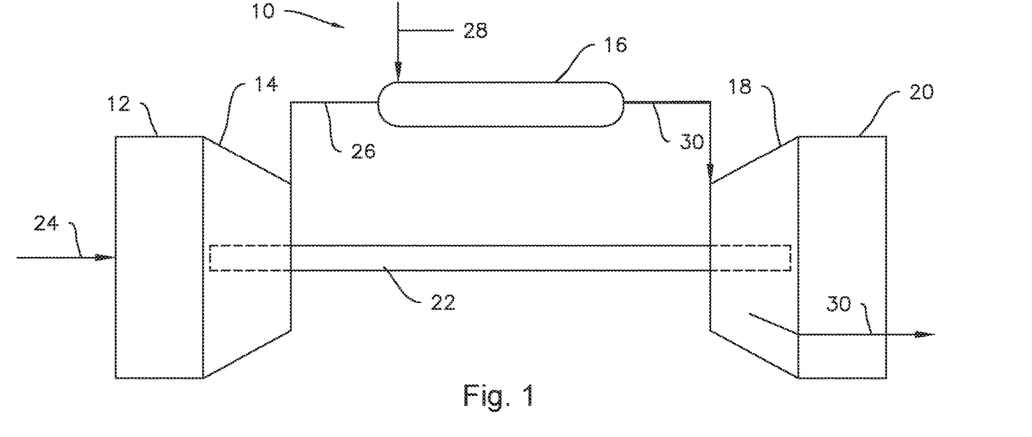
FIG. 1 is a functional block diagram of an exemplary gas turbine that may incorporate various embodiments of the present disclosure.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
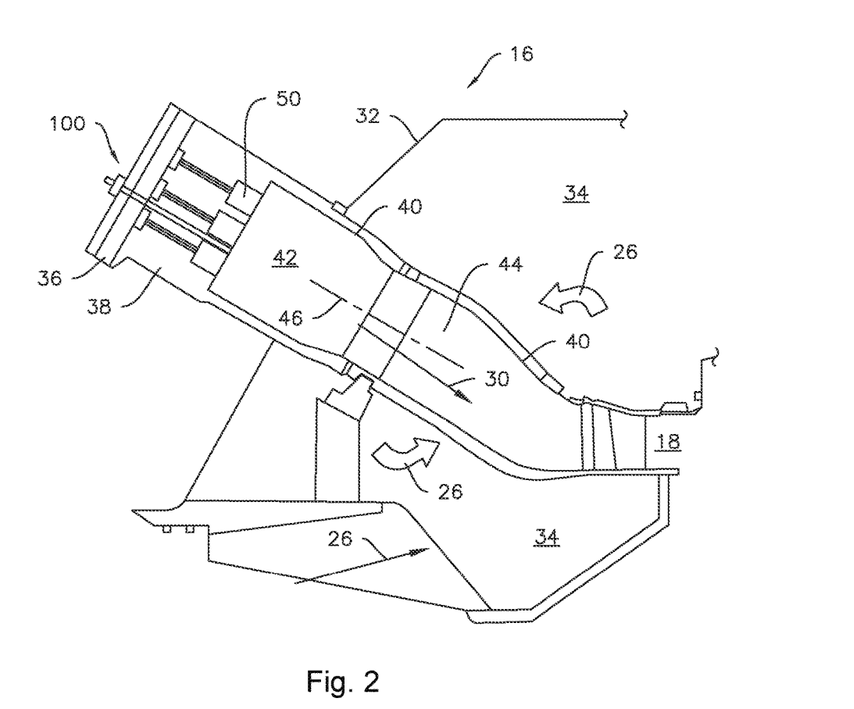
FIG. 2 is a simplified side cross-section view of an exemplary combustor as may incorporate one or more embodiments.

As shown in FIG. 2, the combustor 16 may be at least partially surrounded by an outer casing 32 such as a compressor discharge casing. The outer casing 32 may at least partially define a high pressure plenum 34 that at least partially surrounds various components of the combustor 16. The high pressure plenum 34 may be in fluid communication with the compressor 14 (FIG. 1) so as to receive the compressed air 26 from the compressor 14. An end cover 36 may be coupled to the outer casing 32. In particular embodiments, the outer casing 32 and the end cover 36 may at least partially define a head end volume or portion 38 of the combustor 16.

In particular embodiments, the head end portion 38 is in fluid communication with the high pressure plenum 34 and/or the compressor 14. One or more liners or ducts 40 may at least partially define a combustion chamber or zone 42 for combusting the fuel-air mixture and/or may at least partially define a hot gas path 44 through the combustor, for directing the combustion gases 30 towards an inlet to the turbine 18. One or more fuel nozzles 50 may be coupled to the end cover 36 and extend towards the combustion chamber 42. An igniter 100 may be in operative communication with the combustor 16 and the igniter 100 may be configured to initiate combustion in the combustor 16. The igniter 100 may extend axially downstream from the end cover 36. As used herein in the context of the combustor 16, "axially" is with respect to an axial centerline 46 of the combustor 16, e.g., the igniter 100 may extend downstream from the end cover 36 along or parallel to the axial centerline 46. In other embodiments, the igniter 100 may extend at any suitable angle such that the igniter 100 is in communication with the combustion chamber 42. For example, in some embodiments, the igniter 100 may be oriented perpendicularly to the axial centerline 46.

Figure 3:
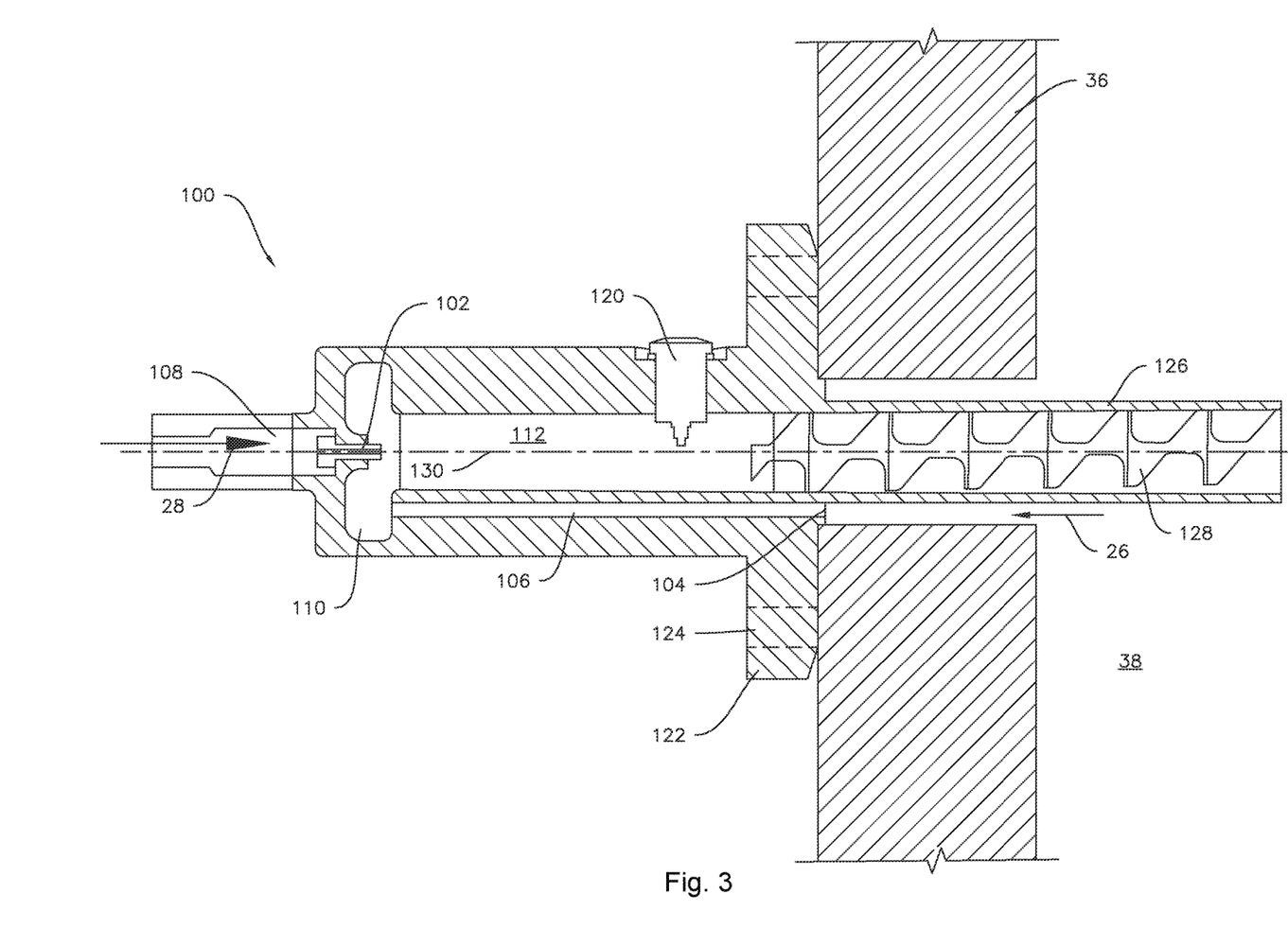
FIG. 3 is a side cross-section view of an exemplary igniter according to one or more embodiments of the present disclosure.

As shown for example in FIG. 3, the igniter 100 may include a mounting flange 122 configured for coupling the igniter 100 to the combustor 16. In some embodiments, the mounting flange 122 may include bolt holes 124 for receiving bolts through the bolt holes 124 to fasten the igniter 100 to the combustor 16. In particular, the mounting flange 122 may be configured for coupling the igniter 100 to the end cover 36 of the combustor 16. In such embodiments, the igniter 100 may be coupled to the end cover 36 of the combustor 16 such that a central axis 130 of the igniter 100 may be generally parallel to the central axis 46 (FIG. 2) of the combustor 16.

Figure 4:
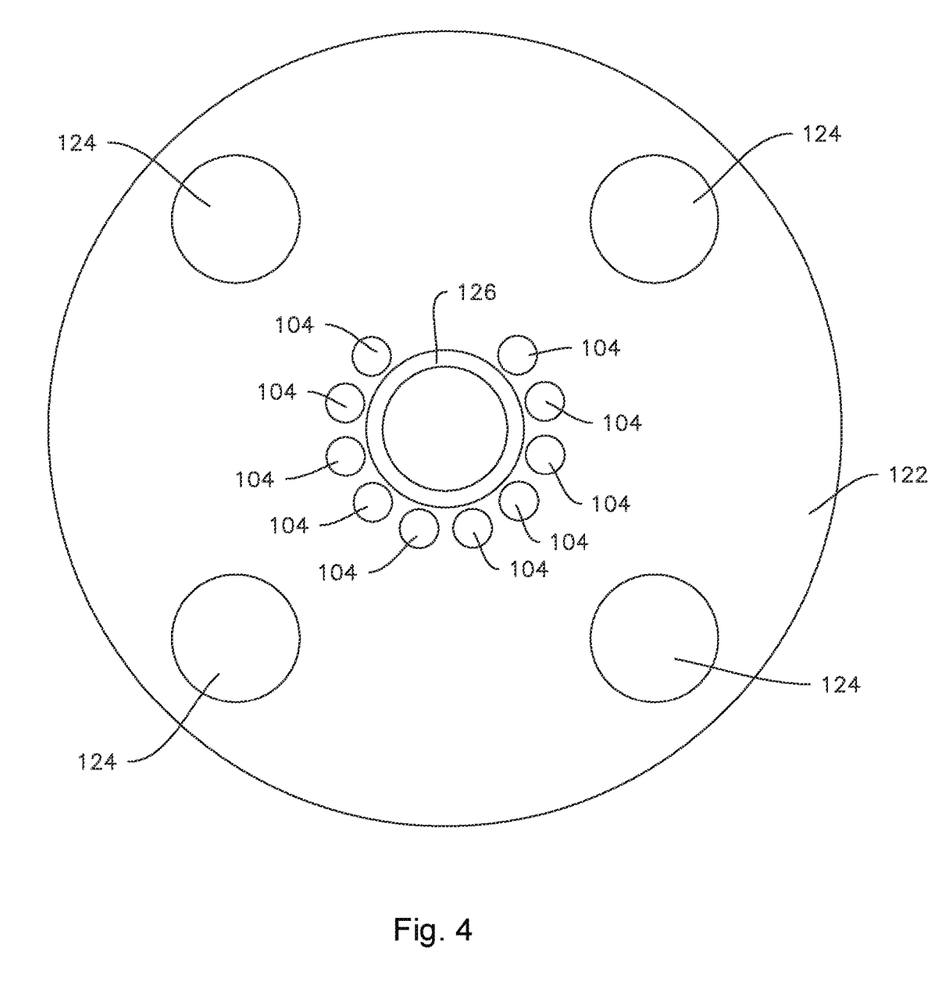
FIG. 4 is an end view of the exemplary igniter of FIG. 3.

As may be seen, e.g., in FIGS. 3 and 4, the igniter may include one or more air inlets 104. In some embodiments, the air inlet(s) 104 may be in fluid communication with the head end 38 and positioned to receive a flow of compressed air 26 from the head end 38. In some embodiments, each air inlet 104 opens into a respective air conduit 106. Each of the air conduits 106 provides fluid communication between a corresponding air inlet 104 and a mixing plenum 110. As illustrated for example in FIG. 3, a fuel conduit 108 may be in fluid communication with the mixing plenum 110 via a fuel inlet 102. The mixing plenum 110 may be positioned upstream of a mixing channel 112. Fuel 28 and air 26 may be mixed in the mixing plenum 110 and in the mixing channel 112 prior to ignition by an ignition source 120. The ignition source 120 may be, e.g., a sparkplug. The ignition source 120 may be in operative communication with the mixing channel 112. In some example embodiments, the ignition source 120 may be positioned proximate to a downstream end of the mixing channel 112. As used herein, terms such as "upstream" or "downstream" are to be understood with reference to the flow direction of mixed fuel 28 and compressed air 26 within the igniter 100, e.g., generally from the mixing plenum 110 towards the combustor 16, e.g., the downstream end of the mixing channel 112 refers to an end of the mixing channel 112 distal from the mixing plenum 110. In some embodiments, the ignition source 120 may be positioned upstream of the mounting flange 122. Such embodiments advantageously provide ease of access to the ignition source 120 when the ignition source 120 is positioned outside of the combustor 16 rather than proximate to the combustion chamber 42.

The mixing channel 112 may extend axially between the mixing plenum 110 and an ejector tube 126. The ejector tube 126 may be positioned downstream of the mixing channel 112. In particular, the ejector tube 126 may be positioned downstream of the ignition source 126 to receive combustion products, e.g., hot gases, generated upon ignition of the mixed fuel 28 and air 26 by the ignition source 120. The ejector tube 126 may extend into the combustor 16, e.g., through the end cover 36 to provide a pilot flame to the combustion chamber 42. In some embodiments, the ejector tube 126 may optionally include a swirler 128 downstream of the ignition source 120. For example, as illustrated in FIG. 3, the swirler 128 may be a ribbon swirler. Other example embodiments of the swirler 128 may include swirler vanes, turbulators, and the like.

As illustrated for example in FIG. 3, in some embodiments, the cross-sectional shape of the mixing channel 112 may be constant, e.g., the mixing channel 112 may be cylindrical. In other embodiments, the mixing channel 112 may have other prismatic shapes, e.g., the mixing channel 112 may be a rectangular prism, or may have other polygonal cross-section shapes such as but not limited to hexagonal.

Figure 5:
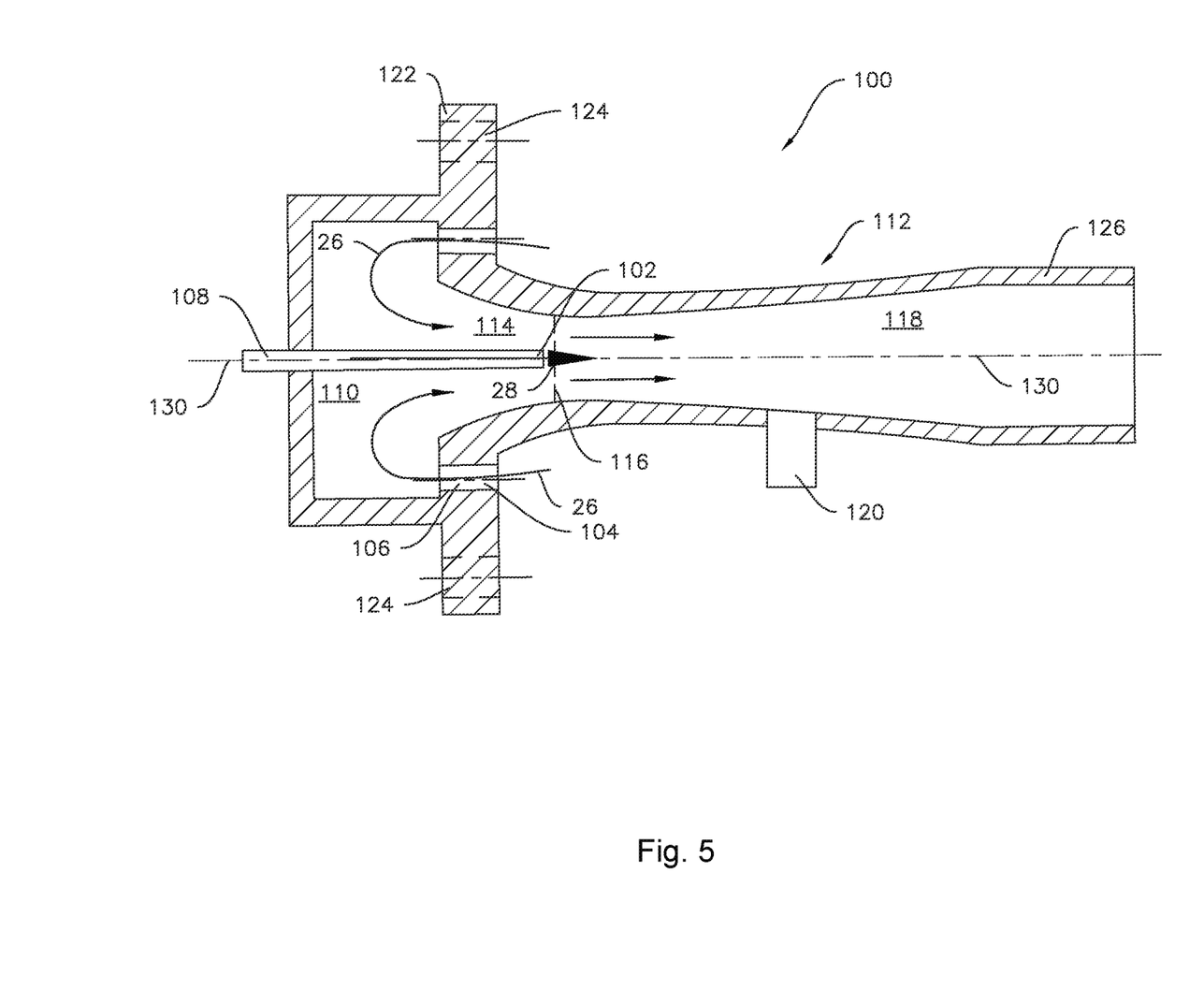
FIG. 5 is a side cross-section view of an exemplary igniter according to one or more embodiments of the present disclosure.

In some embodiments the mixing channel 112 may define a plurality of distinct inner diameters. Generally, the mixing channel 112 may define a first inner diameter portion 114 in an upstream portion of the mixing channel 112, and may define a minimum inner diameter at a throat portion 116 downstream of first inner diameter portion 114, and a second inner diameter portion 118 downstream of the throat portion 116. The minimum inner diameter at the throat portion 116 may be less than the inner diameter at the first inner diameter portion 114 or at the second inner diameter portion 118. In various embodiments, the inner diameter at the first inner diameter portion 114 may be greater than or substantially equal to the inner diameter at the second inner diameter portion 118. In some embodiments, for example, as illustrated in FIG. 5, the plurality of distinct internal diameters may form a venturi shape. As shown in FIG. 5, the first inner diameter portion 114 may form a converging section 114 of the venturi shape, the second inner diameter portion 118 may form a diverging section 118, and the throat portion 116 may thus be a venturi throat 116. In some example embodiments, the venturi shape may include the converging section 114 between an upstream end of the mixing channel 112 and a venturi throat 116. For example, the converging section 114 may extend between an end of the mixing channel 112 proximate to the mixing plenum 110 and the venturi throat 116. The converging section 114 may include a section of the mixing channel 112 wherein the cross-sectional area of the mixing channel 114 decreases moving axially downstream from the mixing plenum 110 to the venturi throat 116. Thus, the venturi throat 116 may define a minimum cross-sectional area of the mixing channel 112 and/or an inflection point in the venturi shape. The diverging section 118 of the venturi shape may be positioned downstream of the venturi throat 116. For example, the cross-sectional area of the mixing channel 112 may increase moving axially downstream from the venturi throat 116 over the axial length of the diverging section 118.

Figure 6:
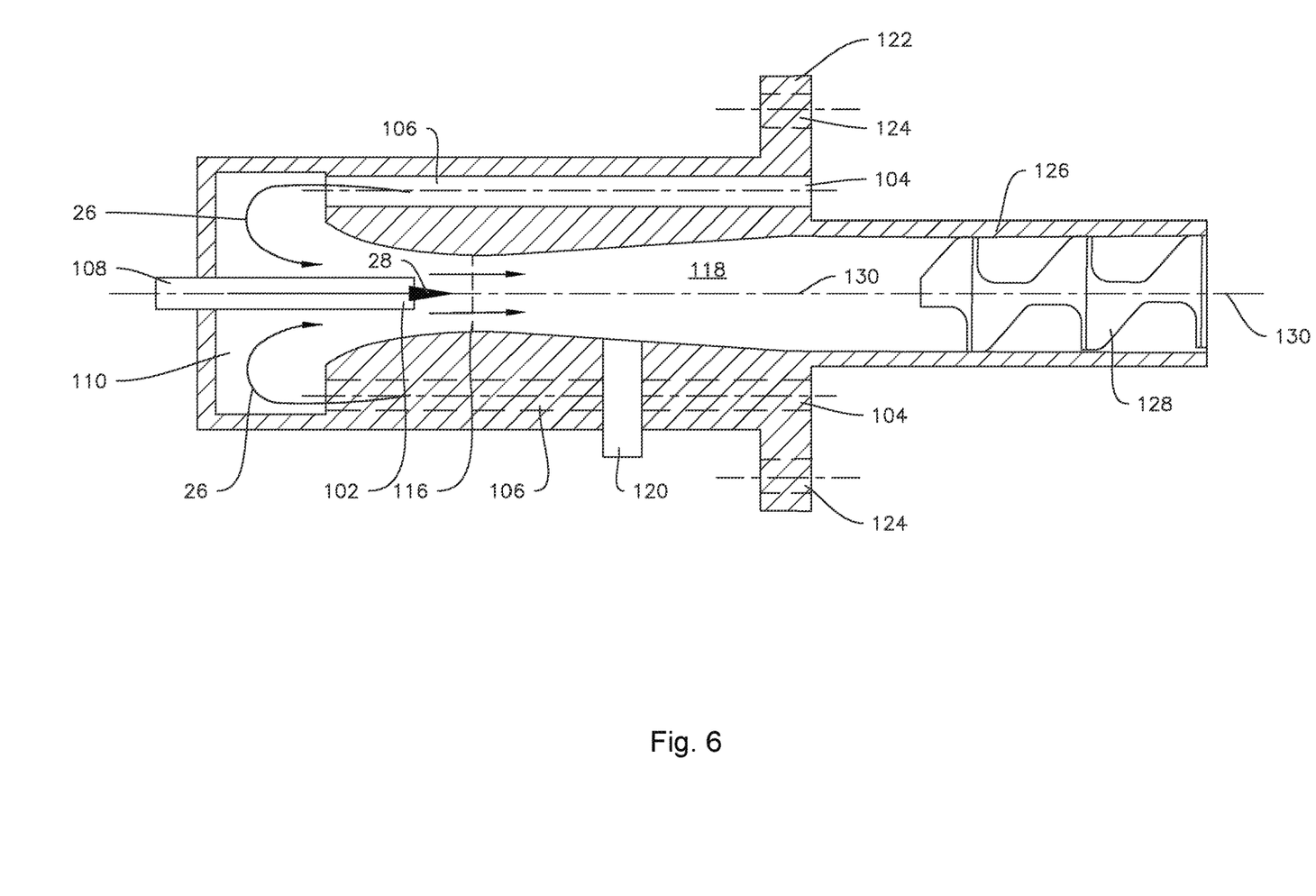
FIG. 6 is a side cross-section view of an exemplary igniter according to one or more embodiments of the present disclosure.

As illustrated in FIGS. 5 and 6, the fuel inlet 102 may extend axially (e.g., along or parallel to central axis 130 of the igniter 100) such that fuel 28 is provided at or near to the venturi throat 116. For example, in various embodiments, the fuel inlet 102 may extend to the venturi throat 116 or just upstream of the venturi throat 116 with respect to the flow of air 26 through the mixing channel 114. In such embodiments, providing fuel injection at or near the venturi throat 116 may advantageously provide an optimal pressure drop where the air 26 flowing through the venturi shape will achieve low air pressure and high velocity at the venturi throat 116, as compared to other portions of the mixing channel 114.

In embodiments including the venturi shape, the ignition source 120 may be positioned downstream of the venturi throat 116. In some embodiments, for example as illustrated in FIG. 5, the ignition source 120 may be downstream of the mounting flange 122. In such embodiments, the ignition source 120 may be disposed within the combustor 16, e.g., within the head end 38. In other embodiments, e.g., as illustrated in FIG. 6, the mounting flange 122 may be positioned downstream of the ignition source 120, such that the ignition source 120 may be positioned outside of the combustor 16, e.g., outside of the head end 38, when the ignitor 100 is mounted to the end cover 36 of the combustor.

As illustrated in FIG. 5, embodiments of the igniter 100 include the mixing channel 112 defining a venturi shape without the swirler 128. As illustrated in FIG. 6, embodiments of the igniter 100 include the mixing channel 112 defining a venturi shape in combination with the ignition source 120 upstream of the mounting flange. As noted above, features illustrated or described as part of one embodiment may be used on another embodiment to yield a still further embodiment. Such further embodiments may include various combinations of the illustrated features. For example, the cylindrical mixing channel 112 as illustrated in FIG. 3 may also be combined with an ignition source 120 downstream of the mounting flange 122, as illustrated in FIG. 5. As another example, the igniter 100 of FIG. 5 may also include a swirler 128, as illustrated in FIGS. 3 and/or 6. Also as noted above, each example is provided by way of explanation, not limitation and it is intended that the present disclosure covers such modifications and variations as come within the scope of the appended claims and their equivalents.

Figure 7:
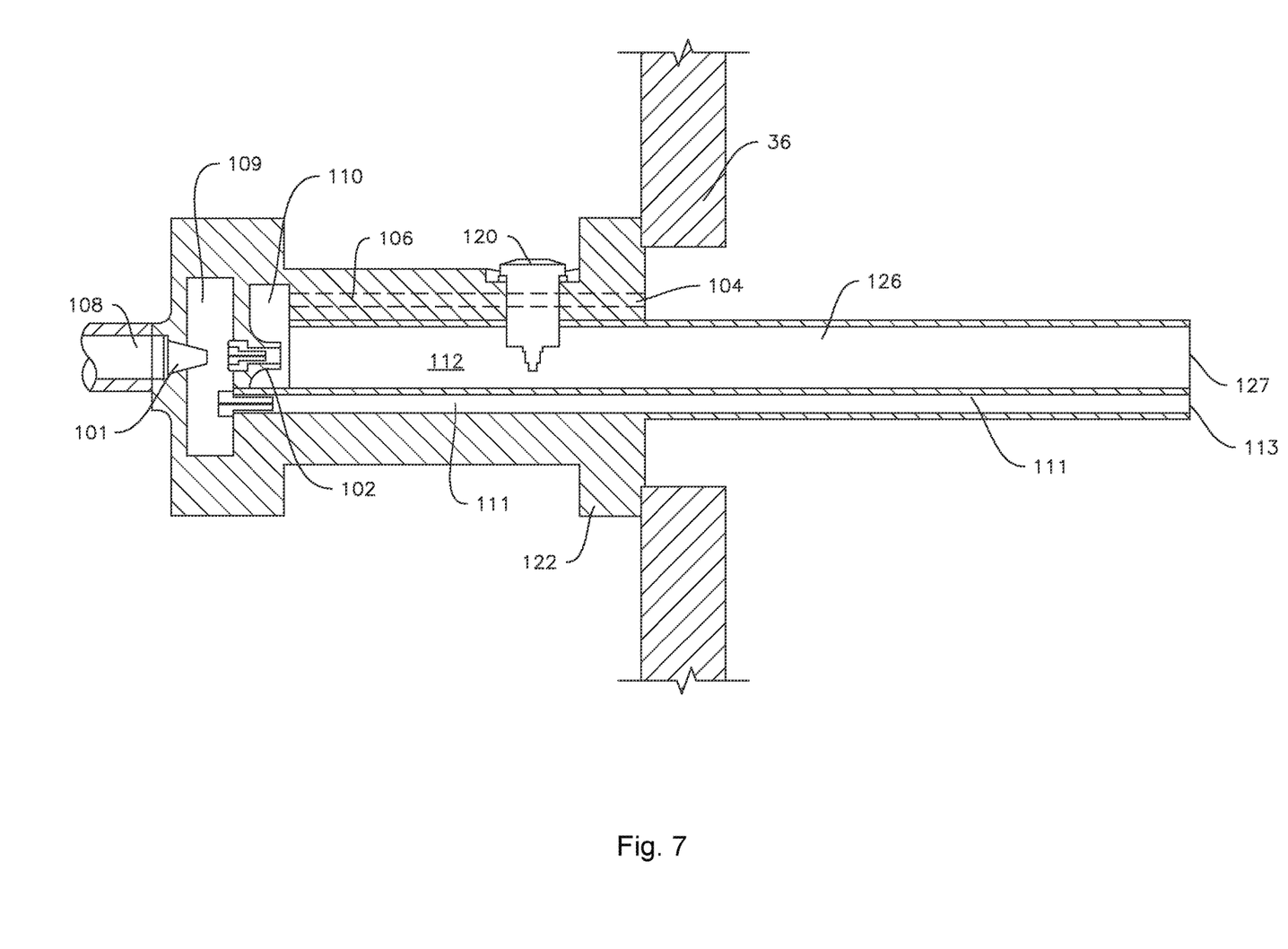
FIG. 7 is a side cross-section view of an exemplary igniter according to one or more embodiments of the present disclosure.
Figure 8:
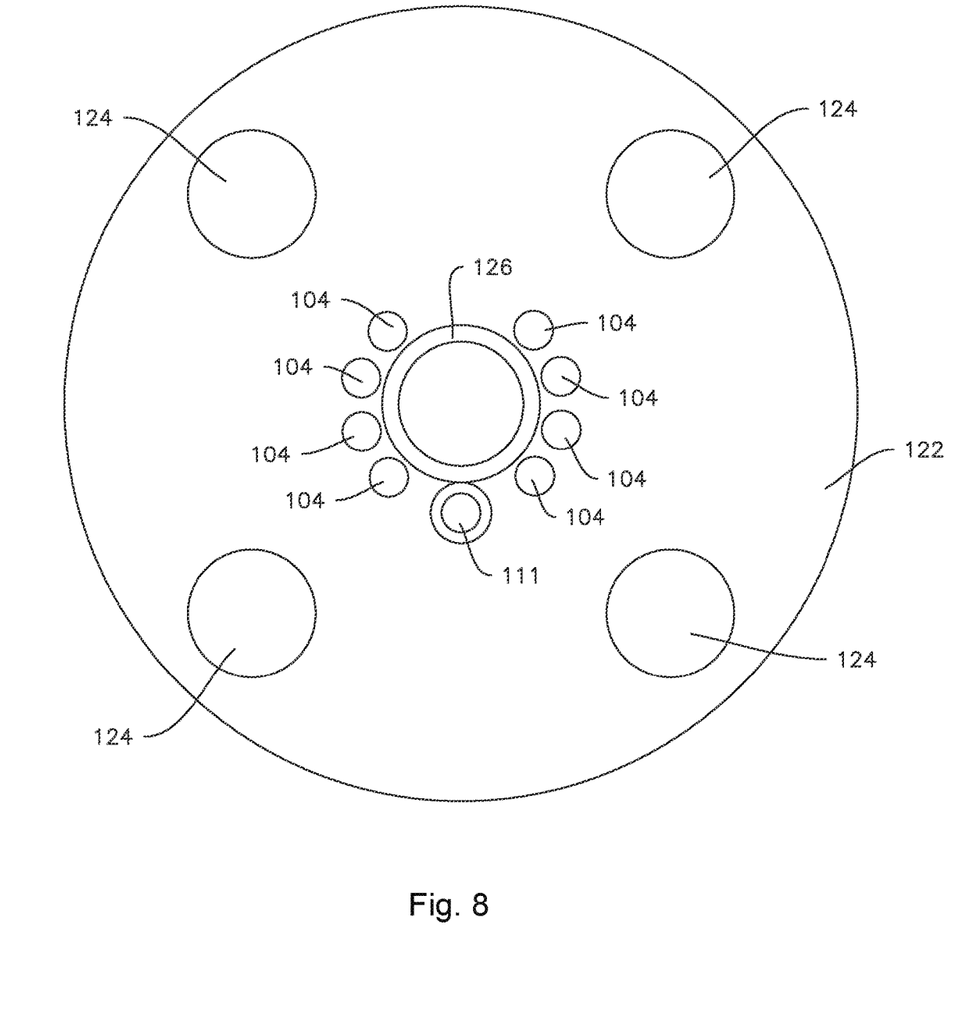
FIG. 8 is an end view of the exemplary igniter of FIG. 7.

FIGS. 7 and 8 illustrate another exemplary embodiment of the ignitor 100. As illustrated in FIG. 7, fuel conduit 108 may first be in fluid communication with a fuel plenum 109 upstream of the mixing plenum 110. For example, the fuel conduit 108 may be in direct fluid communication with the fuel plenum 109 via a first fuel inlet 101 and the fuel inlet 102, as described above, may be a second fuel inlet in such embodiments. As illustrated in FIG. 7, in some embodiments, a fuel filter may be provided in first fuel inlet 101. Accordingly, the fuel conduit 108 may be in direct fluid communication with the fuel plenum 109 via the first fuel inlet 101 and in indirect fluid communication with the mixing plenum 110 via the second fuel inlet 102. For example, in such embodiments, fuel 28 may flow from the fuel plenum 109 through the second fuel inlet 102 and into the mixing plenum 110, while air 26 flows into the mixing plenum 110 via air conduits 106. Some embodiments may also include a second fuel conduit 111 which extends from the fuel plenum 109 into the combustor 16, e.g., through the end cover 36, to supply fuel 28 to the pilot flame. For example, in some embodiment the pilot flame may emanate from the ejector tube 126. Accordingly, an outlet 113 of the second fuel conduit 111 may be proximate to an outlet 127 of the ejector tube 126. As illustrated in FIG. 8, the second fuel conduit 111 may be proximate to, and in some embodiments, abutting, the ejector tube 126. For example, the ignition source 120 may be positioned in a first portion, e.g., a top portion, of the ignitor 100 and the second fuel conduit 109 may be positioned second portion, e.g., a bottom portion, diametrically opposite the ignition source. As illustrated in FIG. 8, in some embodiments, the air inlets 104 may extend circumferentially around and spaced from the ejector tube 126 between the second fuel conduit 111 and the ignition source 120 (FIG. 7).

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An igniter for use in a gas turbine, the igniter comprising:
    a mixing channel defining a venturi shape, the venturi shape comprising a converging section between an upstream end of the mixing channel and a venturi throat;
    a swirler positioned in the mixing channel downstream of the venturi shape, wherein the swirler is chosen from one of a ribbon swirler, a swirler vane, or a turbulator;
    a fuel inlet in fluid communication with the mixing channel;
    an air inlet in fluid communication with the mixing channel; and
    an ignition source in operative communication with the mixing channel, the ignition source positioned downstream of the fuel inlet.

2. The igniter of claim 1, further comprising a mounting flange configured for coupling the igniter to a combustor of the gas turbine, wherein the ignition source is upstream of the mounting flange.

3. The igniter of claim 1, wherein the ignition source of the igniter is positioned downstream of the venturi throat.

4. The igniter of claim 1, wherein the venturi shape of the mixing channel further comprises a diverging section downstream of the venturi throat, and wherein the ignition source is positioned on the diverging section.

5. The igniter of claim 1, wherein the swirler is positioned downstream of the ignition source.

6. The igniter of claim 1, wherein the igniter further comprises a mixing plenum and a fuel plenum upstream of the mixing plenum, and wherein a fuel conduit extends from the fuel plenum.

7. The igniter of claim 1, wherein the ignition source comprises a sparkplug.

8. A combustor head end portion comprising:
    a central axis;
    an end cover;
    an igniter coupled to the end cover and extending axially from the end cover, the igniter comprising:
        a mixing channel defining a venturi shape, the venturi shape comprising a converging section between an upstream end of the mixing channel and a venturi throat;
        a swirler positioned in the mixing channel downstream of the venturi shape,
    wherein the swirler is chosen from one of a ribbon swirler, a swirler vane, or a turbulator;
        a fuel inlet in fluid communication with the mixing channel;
        an air inlet in fluid communication with the mixing channel; and
        an ignition source in operative communication with the mixing channel, the ignition source positioned downstream of the fuel inlet.

9. The combustor head end portion of claim 8, further comprising a mounting flange coupling the igniter to the end cover, wherein the ignition source is upstream of the mounting flange.

10. The combustor head end portion of claim 8, wherein the ignition source of the igniter is positioned downstream of the venturi throat.

11. The combustor head end portion of claim 8, wherein the venturi shape of the mixing channel further comprises a diverging section downstream of the venturi throat.

12. The combustor head end portion of claim 8, wherein the igniter further comprises a fuel plenum upstream of a mixing plenum and a fuel conduit extending from the fuel plenum.

13. A gas turbine, comprising:
    a compressor;
    a turbine;
    a combustor disposed downstream from the compressor and upstream from the turbine; an igniter in operative communication with the combustor, the igniter configured to initiate combustion in the combustor, the igniter comprising:
        a mixing channel defining a venturi shape, the venturi shape comprising a converging section between an upstream end of the mixing channel and a venturi throat;
        a swirler positioned in the mixing channel downstream of the venturi shape,
    wherein the swirler is chosen from one of a ribbon swirler, a swirler vane, or a turbulator;
        a fuel inlet in fluid communication with the mixing channel;

an air inlet in fluid communication with the mixing channel; and an ignition source in operative communication with the mixing channel, the ignition source positioned downstream of the fuel inlet.

14. The gas turbine of claim 13, wherein the igniter further comprises a mounting flange coupling the igniter to an end cover of the combustor, wherein the ignition source is upstream of the mounting flange.

15. The gas turbine of claim 13, wherein the ignition source of the igniter is positioned downstream of the venturi throat.

16. The gas turbine of claim 13, wherein the venturi shape of the mixing channel further comprises a diverging section downstream of the venturi throat.

17. The gas turbine of claim 13, wherein the igniter is coupled to an end cover of the combustor and a central axis of the igniter is generally parallel to a central axis of the combustor.

18. The gas turbine of claim 13, wherein the igniter further comprises a fuel plenum upstream of a mixing plenum and a fuel conduit extending from the fuel plenum towards a combustion chamber in the combustor.

\* \* \* \* \*